United States Patent [19]

Yoshimura et al.

[11] Patent Number: 5,246,476
[45] Date of Patent: Sep. 21, 1993

[54] METHOD FOR MANUFACTURING OPTICAL ELEMENTS WITH SELECTIVE HEATING AND PRESSING

[75] Inventors: Fumitaka Yoshimura; Tomomasa Nakano, both of Yokohama, Japan

[73] Assignee: Canon Kabushiki Kaisha, Tokyo, Japan

[21] Appl. No.: 915,885

[22] Filed: Jul. 20, 1992

Related U.S. Application Data

[63] Continuation of Ser. No. 692,648, Apr. 30, 1991, abandoned.

[30] Foreign Application Priority Data

May 15, 1990 [JP] Japan .................. 2-123071
May 24, 1990 [JP] Japan .................. 2-135879

[51] Int. Cl.⁵ .................. C03B 11/00; C03B 11/04
[52] U.S. Cl. .................. 65/29; 65/64; 65/102; 65/244; 65/246; 65/260
[58] Field of Search .................. 65/102, 29, 64, 260, 65/243, 244, 246, 274, 278, 158

[56] References Cited

U.S. PATENT DOCUMENTS

| | | | |
|---|---|---|---|
| 3,860,408 | 1/1975 | Mastik | 65/102 |
| 3,961,927 | 6/1976 | Alderson | 65/182.2 |
| 4,042,365 | 8/1977 | Champenois | 65/260 |
| 4,398,935 | 8/1983 | Smulders | 65/64 |
| 4,723,976 | 2/1988 | Shanaberger | 65/29 |
| 4,737,131 | 4/1988 | Lopez-Zermeno | 65/29 |
| 4,778,505 | 10/1988 | Hirota | 65/321 |
| 4,836,838 | 6/1989 | Hirota | 65/321 |
| 4,913,718 | 4/1990 | Yoshimura | 65/104 |
| 4,915,720 | 4/1990 | Hirota | 65/268 |
| 5,032,159 | 7/1991 | Kuwabara | 65/64 |

*Primary Examiner*—W. Gary Jones
*Assistant Examiner*—John Hoffman
*Attorney, Agent, or Firm*—Fitzpatrick, Cella, Harper & Scinto

[57] ABSTRACT

A method for forming a glass preform into an optical element utilizing a formation chamber having a central axis and including a plurality of glass preform heaters, a plurality of glass preform pressing molds, and a conveyor, an exchanging chamber and a controller, comprises the steps of providing the heaters and the pressing molds along a circular path substantially concentric with the formation chamber and providing the conveyor to rotate coaxially with the central axis of the formation chamber. The operating condition of the heater is detected, the glass preform is conveyed from the exchanging chamber to a heater based on the detected condition of the heaters, and the glass preform is heated. The operating condition of the pressing molds is detected, the heated glass preform is conveyed from the heater to a pressing mold based on the detected condition of the pressing molds, the glass preform is pressed in the pressing mold to form an optical element, and the optical element is removed from the pressing mold after a predetermined time.

2 Claims, 5 Drawing Sheets

METHOD FOR MANUFACTURING OPTICAL ELEMENTS WITH SELECTIVE HEATING AND PRESSING

This application is a continuation of U.S. application Ser. No. 07/692,648 filed Apr. 30, 1991, which is now abandoned.

BACKGROUND OF THE INVENTION

1. Field of the Invention

The present invention relates to a method for manufacturing optical elements and the apparatus therefor. Particularly, the present invention relates to a method for continuously obtaining the optical element having an optically functional surface from the molding material by pressing formation.

2. Related Background Art

In recent years, there has been developed a method for manufacturing the optical element having the optically functional high-precision surface, which requires no machining to finish by grinding, lapping, or the like. The method is implemented in such a manner that an optical element molding material, such as a glass blank preparatory formed in a certain shape with a certain surface precision, is accommodated in a molding die having a predetermined surface precision, and is finished by the pressing formation under heating.

Generally, in a pressing formation method of the kind, an upper molding member and a lower molding member are slidably arranged to face each other in a molding barrel member respectively, and a molding material is introduced into a cavity formed by these upper, lower and barrel members. The molding member is heated to a temperature capable of molding, such as a temperature making the molding material to be of $10^8$–$10^{12}$ poise, in a nonoxidizing atmosphere, a nitrogenous atmosphere, for example, in order to prevent the molding member from being oxidized. Then, the molding is closed for pressing for appropriate period of time to transfer the surface shape of the molding member to the surface of the molding material. Subsequently, the temperature of the molding member is lowered to a temperature sufficiently lower than the transition temperature of the glass used as a molding material. Then, after the pressing pressure has been released, the molding member is opened for the delivery of the formed optical element In this respect, it is possible to heat the molding material preparatorily to an appropriate temperature before being introduced into the inside of the molding member, or introduce the molding material into the inside of the molding member after it has been heated to the molding temperature. Further, it is possible to convey the molding material together with the molding member for a continuous and high-speed molding by performing each process of heating, pressing, and cooling at each of the specific locations.

An optical element pressing formation method and the apparatus therefor, such as set forth above, has been disclosed, for example, in Japanese Patent Laid-Open Appln. No. 58-84134, Japanese Patent Laid-Open Appln. No. 49-97009, British Patent No. 378199, Japanese Patent Laid-Open Appln. No. 63-11529, Japanese Patent Laid-Open Appln. No. 59-150728, Japanese Patent Laid-Open Appln. No. 61-26528, Japanese patent Laid-Open Appln. No 61-44721 and others.

Here in order to perform the aforesaid pressing formation continuously in a small apparatus, there has been proposed (in Japanese Patent Publication No. 63-37044) a method wherein heating stations, pressing stations, cooling stations, and others are arranged on a circle to convey the molding materials and the molded optical elements using a conveying means which is rotatable around the central part of the aforesaid circle and is further provided with expansion arms in the radial direction.

However, in this proposed method, the arms are provided in a number corresponding to the number of stations, and each of the arms always conveys the molding material and the molded optical element to the next station in single steps. Eventually, therefore, the molding material passes through each station.

Consequently, this method is such that the linearly conveying path has simply been made circular, and that the manufacturing speed of the optical element depends on the station which consumes the longest process time of all the stations. Hence, not only is there a restriction in speeding up the manufacturing, but also there is a disadvantage that if trouble occurs at any one of the stations, the operation of the entire system must be suspended immediately. Furthermore, since the arms are provided in a number corresponding the number of stations, the structure becomes complicated.

SUMMARY OF THE INVENTION

In consideration of the above-mentioned problems encountered in the conventional technique, an object of the present invention is provide an apparatus for manufacturing optical elements by pressing formation at a high-speed with high efficiency, wherein the miniaturization and simplification of the structure is possible and at the same time, the conveyance of the molding materials and the molded elements is performed with an optimum efficiency in response to the process time required for each of the stations.

Another object of the present invention is to provide a novel method for molding optical elements, according to which there are provided in a molding chamber a plurality of heating means, a plurality of pressing formation means, and means for conveying glass material molded products, and there is included a process for a simultaneous execution of a process for simultaneously heating a plurality of glass materials and a process for simultaneously performing pressing formation of the plurality of the heated glass materials, thereby making it possible to effectively take various countermeasures when there are changes in the time required for heating glass materials to be formed, and the time required for performing the pressing formation due to the changing volumes of the glass materials, the changing characteristics of glass nitric materials, or the like.

In the conventional molding method, the time required for heating the glass material differs from the time required for forming it into the shape of an optical element. Accordingly, when a process for the pressing formation of one glass material is in progress, all the other means in the formation chamber are on standby, making the operation inefficient.

According to the present invention, there is an embodiment in which the number of heating stations and the number of pressing stations are so arranged that the value arrived at by dividing the time required for the heating process at the heating stations by the number of the heating stations is almost equal to the value arrived at by dividing the time required for the pressing process at the pressing stations by the number of pressing stations.

Still another object of the present invention is to provide a molding method and apparatus for improving the productivity per unit time by arranging a plurality of heating stations and a plurality of pressing stations (pressing formation means) in the formation chamber in such a manner that the operational condition of each station is detected to control the conveying sequence of the glass material or the molded lens.

DETAILED DESCRIPTION OF THE PREFERRED EMBODIMENTS

Hereinafter an embodiment according to the present invention will be described with reference to the accompanying drawings.

Figure 1:
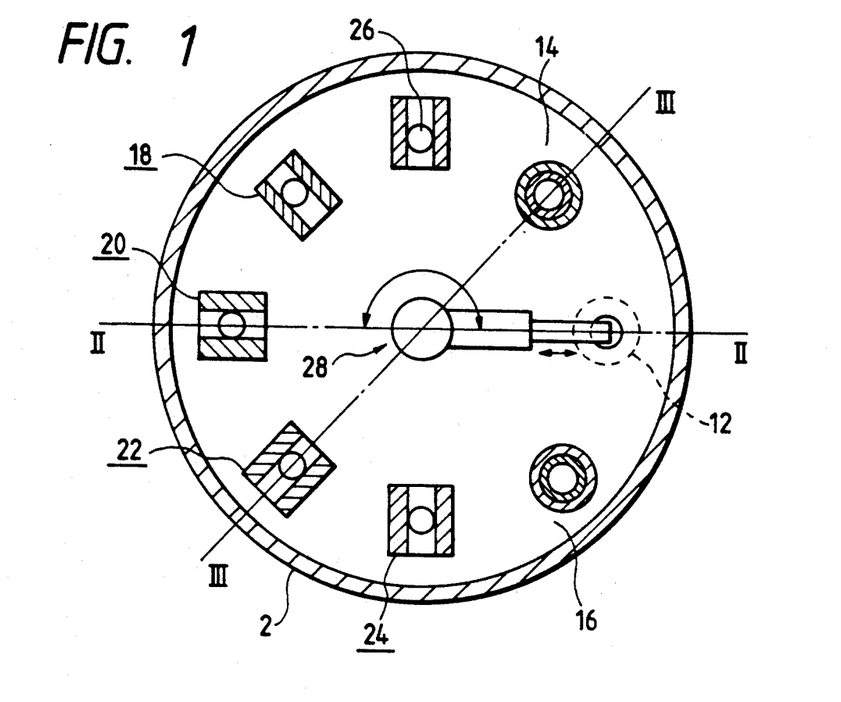
FIG. 1 is a cross-sectional modeling view schematically showing the structure of an embodiment of the apparatus for manufacturing optical elements according to the present invention.
Figure 2:
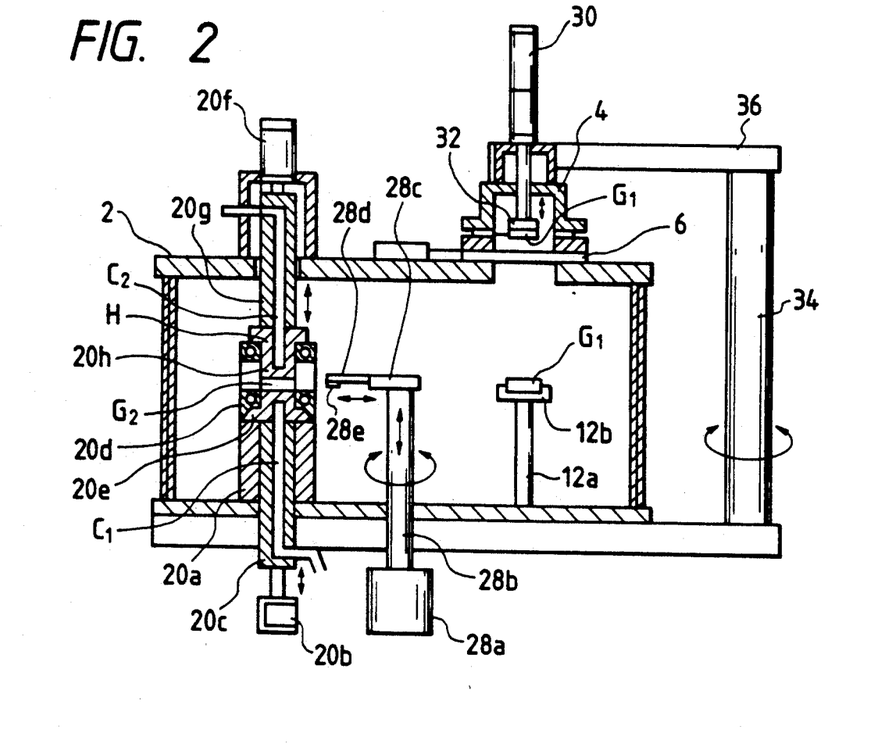
FIG. 2 is a cross-sectional modeling view showing the apparatus taken at line II—II of FIG. 1.
Figure 3:
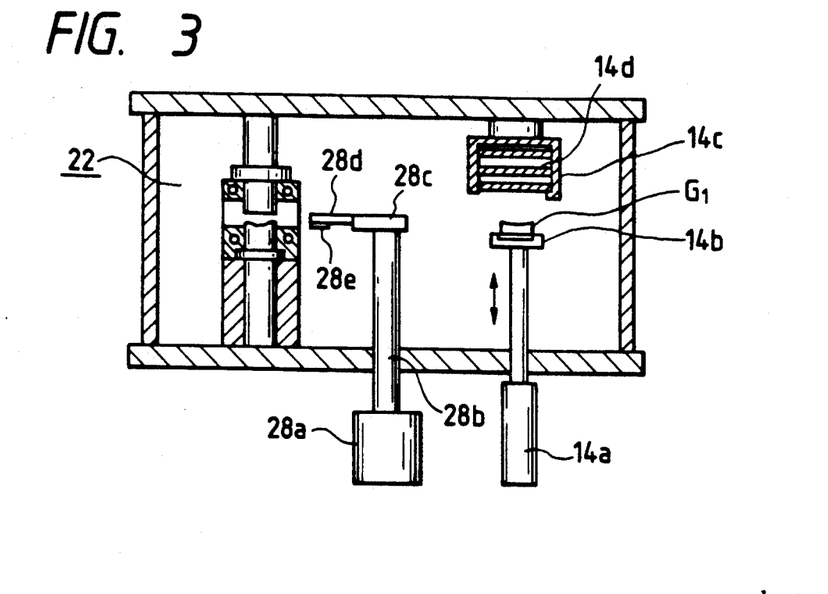
FIG. 3 is a cross-sectional modeling view showing the apparatus taken at line III—III of FIG. 1.

FIG. 1 is a cross-sectional modeling view schematically showing the structure of a manufacturing apparatus thereby implementing a method for manufacturing optical elements according to the present invention. FIG. 2 and FIG. 3 are cross-sectional modeling views respectively showing the apparatus taken at lines II—II and III—III of FIG. 1.

In FIG. 1 through FIG. 3, a reference numeral 2 designates a formation chamber and a reference numeral 4, an exchanging chamber arranged on the upper end thereof. Between the formation chamber 2 and the exchanging chamber 4, a gate valve 6 capable of closing the chambers is provided.

The above-mentioned formation chamber 2 is cylindrical in shape with the center in the vertical direction thereof, and can be sealed from the atmosphere. The formation chamber 2 is connected respectively to a decompression source and a supply source of nitrogen gas, a nonoxidizing gas (not shown). In the formation chamber 2, one relaying station 12, two heating stations 14 and 16, and five pressing stations 18, 20, 22, 24, and 26 are arranged. These stations are equally disposed along the periphery of the center in the vertical direction of the formation chamber 2. Then, conveying means 28 is arranged at the center in the vertical direction of the aforesaid cylindrical formation chamber 2.

The relaying station 12 is positioned directly beneath the aforesaid gate valve 6.

The relaying station 12 comprises a base 12b mounted on the upper end of a supporting pole 12a fixed to the lower part of the formation chamber 2 as shown in FIG. 2.

The heating station 14 comprises a cylinder 14a arranged outside the formation chamber 2, a base 14b mounted on the upper end of a piston rod movable in the vertical direction in the cylinder, a heating cylinder 14c installed on the upper part of the formation chamber 2, and a heater 14d provided in the aforesaid heating cylinder as shown in FIG. 3. Operating the cylinder 14a enables the aforesaid base 14b to be moved into the inside of the heating cylinder 14c.

The heating process in the heating station 14 is such that the base 14b holding a molding material $G_1$ is raised into the inside of the heating cylinder 14c to cause it to be heated to a desired temperature by the heater 14d. Subsequently, the base 14b is lowered to complete the process.

The description has been made of the heating station 14 so far, and the same is also applicable to the heating station 16.

In the pressing station 20, a fixed cylinder 20a is installed in the vertical direction at the bottom of the formation chamber 2 as shown in FIG. 2. Then, in the lower part of the fixed cylinder 20a outside the formation chamber 2, a cylinder 20b is arranged. Here, a reference numeral 20c designates a lower shaft which is movably installed in the vertical direction to the piston rod of cylinder 20b. The lower shaft 20c is slidably accommodated in the vertical direction in the To the upper end of the aforesaid fixed cylinder 20a, the lower end of a cylindrical vertical type guide member 20d is fixed. Also, on the upper end of the aforesaid lower shaft 20c, a lower molding member 20e is arranged. The lower molding member 20e is accommodated in the vertical type guide member 20d and is slidable in the vertical direction along the vertical type guide member 20d.

Also, a cylinder 20f is arranged on the upper end of the formation chamber 2, and an upper shaft 20g, which is substantially concentric with the aforesaid lower shaft 20c, is fixed to the piston rod of the cylinder 20f. The upper shaft 20g is extended into the formation chamber 2 and is movable in the vertical direction. At the lower end of the upper shaft 20g, an upper molding member 20h is held. The upper molding member 20h is accommodated in the vertical type guide member 20d, and is slidable in the vertical direction along the vertical type guide member 20d.

The upper end face of the lower molding member 20e and the lower end face of the upper molding member 20h are the transferring surfaces for the formation of the optically functional surfaces of the optical element to be molded, and are finished with a desired surface precision.

In the lower shaft 20c and the upper shaft 20g, refrigerant passages $C_1$ and $C_2$ are provided. Also, in the vertical type guide member 20d, a heater H is incorporated.

Figure 4:
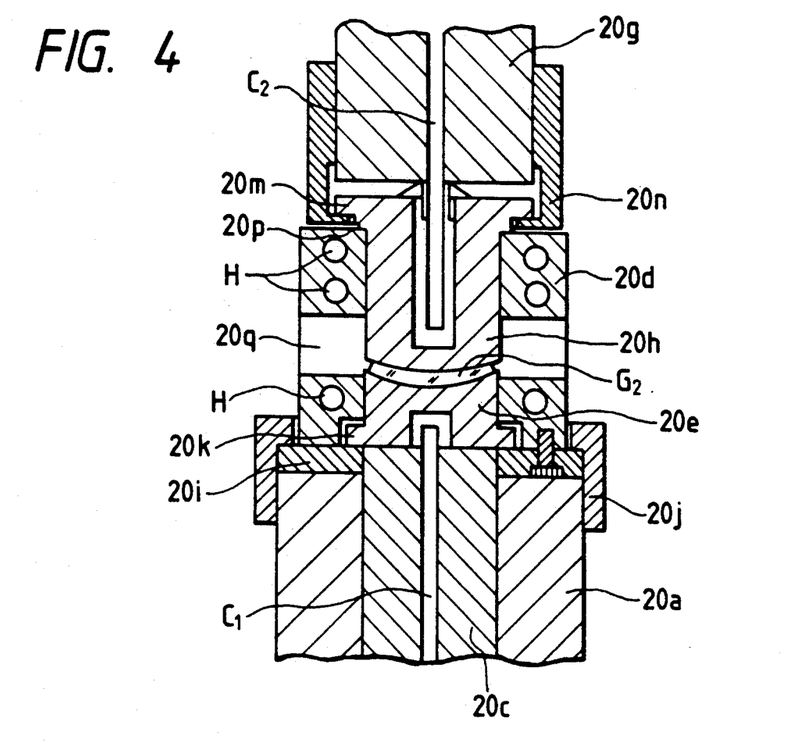
FIG. 4 is a schematically cross-sectional view partially showing the details of the pressing station.

FIG. 4 is a schematically cross-sectional view partially showing the details of the structure of the pressing station 20. In FIG. 4, the same reference marks are provided for the same members appearing in FIG. 1 through FIG. 3.

At the lower end face of the vertical type guide member 20d, a ring plate 20i is fixed, and the ring plate is connectively supported by a ferrule 20j on the fixed cylinder 20a. Also, at the lower end of the aforesaid lower molding member 20e, a flange 20k is formed, the lower end face of which can be butted against the ring plate 20i to define the lowest position of the lower molding member 20e.

At the upper end of the upper molding member 20h, a flange 20m is formed, and the flange 20m is connectively supported by a pair of hooks 20n fixed to the lower end of the upper shaft 20g. A shoulder 20p is formed in the upper molding member 20h at a position immediately below the flange 20m. The shoulder 20p is butted against the upper end face of the vertical type guide member 20d to define the lowest position of the upper molding member 20h.

In addition, at the side of the vertical type guide member 20d, an opening 20q is formed to receive and deliver the molding material and molded optical element.

Figure 5:
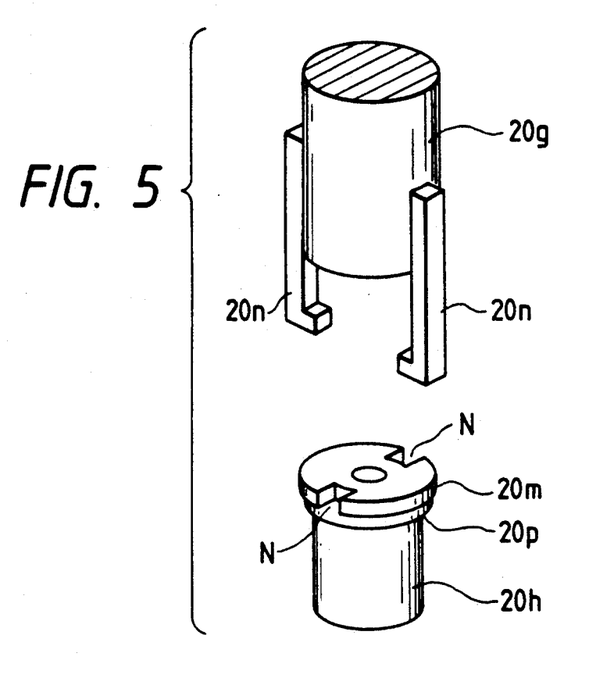
FIG. 5 is a schematically exploded perspective view showing the state of an upper molding member being connectively held.

FIG. 5 is an exploded perspective view schematically showing the state of the upper molding member 20h being connectively supported by the pair of hooks 20n. Notches N are formed in the two locations opposing each other on the flange 20m of the upper molding member 20h, and through the notches N, the leading ends of the hooks 20n are moved from the upper part of the flange to the lower part thereof and is substantially turned 90° to implement the arrangement as shown in FIG. 2.

Figure 6:
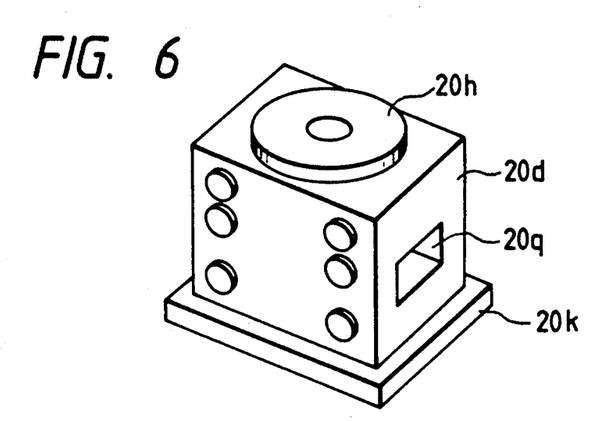
FIG. 6 is a perspective view schematically showing a set of the barrel member and the upper molding member.

FIG. 6 is a perspective view schematically showing a set of the vertical type guide member 20d and the upper molding member 20h.

The pressing process at the pressing station 20 is such that in the vertical type guide member 20d, the molding material is placed between the lower molding member 20e and the upper molding member 20h. The upper molding member 20h is currently moved upwards, and while the heater H is generating heat, the upper shaft 20g is lowered to move both the upper molding member 20h and the lower molding member 20e to the lowest positions to close the mold. Then, by pressing the material to a desired dimension to form an optical element $G_2$. Subsequently, the heating operation of the heater H is suspended, and the refrigerant is flown through the refrigerant passages $C_1$ and $C_2$ to perform the cooling to a desired temperature. After that, the upper molding member 20h is raised to open the mold to complete the pressing process. While the cooling is performed, the lower molding member 20e is compressed upwards by an appropriate pressure to prevent any retraction.

The description has been made of the pressing station 20 so far, and the same is also applicable to the stations 18, 22, 24, and 26.

The conveying means 28 comprises, as shown in FIG. 2, a rotation driving unit 28a installed outside the formation chamber 2; a rotational shaft 28b fixed to the rotation driving unit 28a, which is extended into the formation chamber 2 in the vertical direction; a horizontal expansion driving unit 28c installed on the upper end of the rotational shaft 28b, an arm 28d fixed to the driving unit 28c, which is horizontally extended; and a suction 28e installed on the lower face of the leading end of the arm 28d. The suction 28e is a vacuum suction to hold the molding material and molded optical element by sucking the upper face thereof. Also, the rotational shaft 28b is provided with an interior structure to enable it to expand or contract in the vertical direction.

Therefore, by combining the rotation of the rotational shaft 28b around the axis in the vertical direction and the expansion or contraction thereof in the vertical direction with the expansion or contraction of the arm 28d in the radial direction, it is possible to implement the access and conveyance by the suction 28e to the relaying station 12, heating stations 14 and 16, and pressing stations 18, 20, 22, 24, and 26.

At the time of access and conveyance to the relaying station 12, the arm 28d is directed towards the relaying station 12 by rotating the rotational shaft 28b to position the suction 28e above the base 12b by extending the arm 28d. Subsequently, the rotational shaft 28b is contracted to allow the suction to suck the molding material on the base 12b (or place on the base 12b the molded optical element which has been sucked by the suction 28e). Then, the suction is retracted from the relaying station by extending the rotational shaft 28b and contracting the arm 28d.

At the time of access and conveyance to the heating stations 14 and 16, the arm 28d is directed towards the desired heating station by rotating the rotational shaft 28b, and the suction 28e is positioned above the base 14b and others by expanding the arm 28d. Subsequently, the rotational shaft 28b is contracted to place on the base 14b and others the molding material which has been sucked by the suction 28e (or suck the molding material on the base 14b and others.) Then, the suction is retracted from the heating station by expanding the rotational shaft 28b and contracting the arm 28d.

At the time of the access and conveyance to the pressing stations 18, 20, 22, 24, and 26, the arm 28d is directed towards the desired pressing station by rotating the rotational shaft 28b, and the suction 28e is advanced into the vertical type guide member from the opening 20q and others of the vertical type guide member by expanding the arm 28d and is positioned above the lower molding member 20e. Subsequently, the rotational shaft 28b is contracted to place on the lower molding member 20e and others the molding material which has been sucked by the suction 28e (or to suck the molded optical element on the lower molding member 20e and others). Then, the suction is retracted from the pressing station by expanding the aforesaid rotational shaft 28b and contracting the arm 28d.

Above the exchanging chamber 4, a cylinder 30 is installed as shown in FIG. 2, and the lower end of the piston rod in the vertical direction of the cylinder 30 is extended into the exchanging chamber 4, and at the leading end thereof, a mechanical chuck 32 is provided. The inside of the exchanging chamber is vacuumized to replace the atmosphere by $N_2$. Consequently, the suction is impossible. (The molding work drops when such an atmospheric change takes place in the chamber.) The mechanical chuck 32 catches the periphery of the work by its fingers so as to hold the molding material and molded optical element by its peripheries in the same fashion. Thus, means for conveying the molding material and molded optical element is configured between the exchanging chamber 4 and the relaying station 12 including the aforesaid cylinder 30 and the mechanical chuck 32.

The exchanging chamber 4 is installed at the leading end of the arm 36 fixed to the rotational pole 34 which is movably arranged in the vertical direction outside the formation chamber 2, and is transported by a rotation driving means (not shown) between the position shown in FIG. 2 and the unit (not shown) for collecting the molding materials and molded optical elements. This transportation is performed with the gate valve 6 being closed.

The exchanging chamber 4 is connected respectively to a decompression source and a supply source of nitrogen gas, i.e., a nonoxidizing gas (not shown). Also, the exchanging chamber 4 can be sealed from the atmosphere at the position shown in FIG. 2. Therefore, it is possible to reduce the inside pressure and fill in the inside with the nitrogen gas atmosphere. Then, at the time of conveying the molding material and molded optical element between the mechanical chuck 32 in the exchanging chamber 4 and the relaying station 12, the insides of the formation chamber 2 and the exchanging chamber 4 are filled in with the nitrogen gas atmosphere, and the gate valve 6 is opened to allow the mechanical chuck 32 to decend and place on the base 12b the molding material G, which has been held by the mechanical chuck 32 (or to hold the molded optical element on the base 12b). Subsequently, the mechanical chuck 32 is raised to the inside of the exchanging chamber 4. Then, the gate valve 6 is closed.

Figure 7:
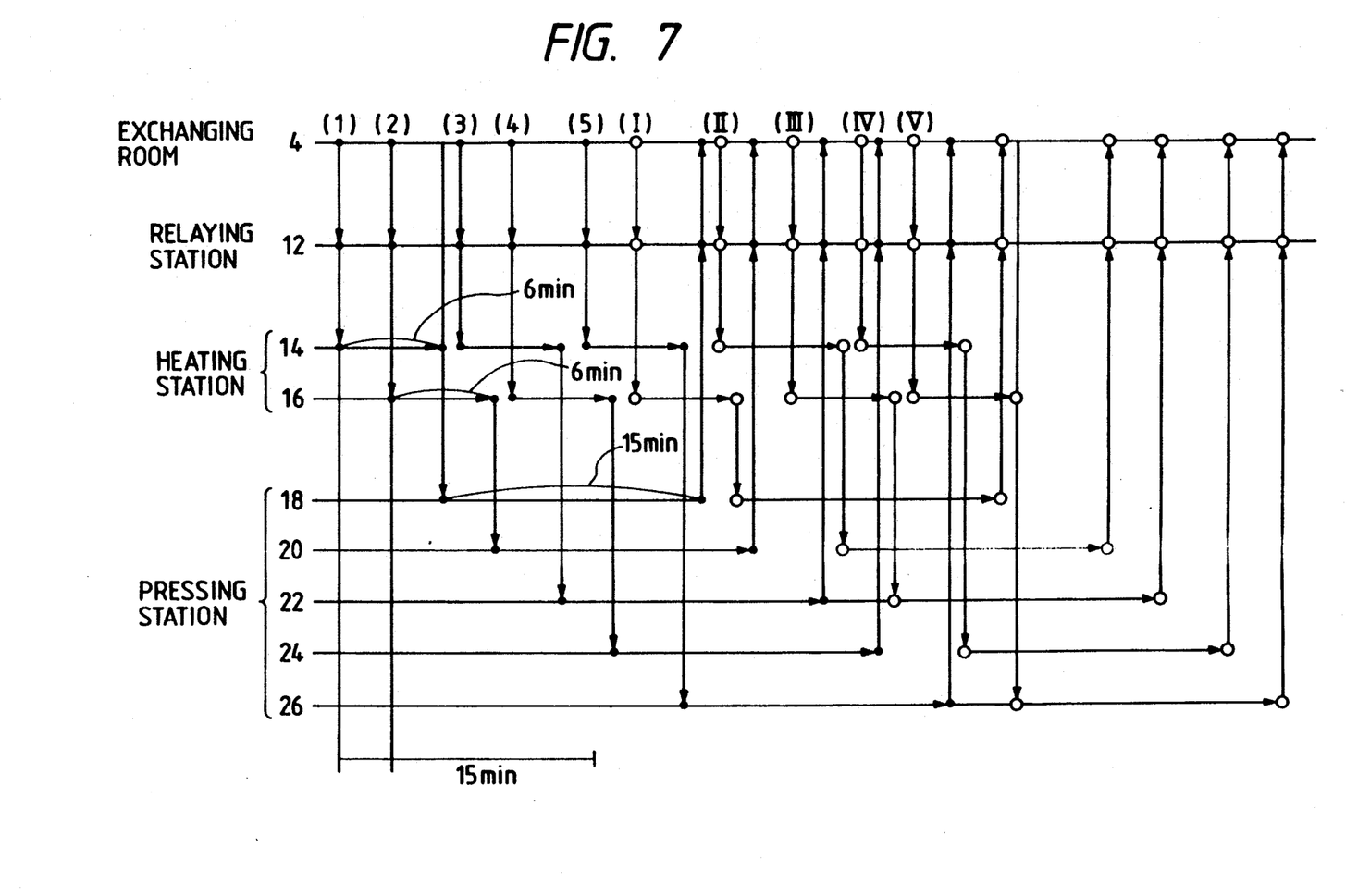
FIG. 7 is a diagram showing the molding materials and the molded optical elements being transported and the timing for the conveyance thereof.

Now, the description will be made of the transporting operation for the molding material and molded optical element between the exchanging chamber 4 and the relaying station 12 in the apparatus of the present invention and the conveying operation for the molding material and molded optical element by the conveying means 28. FIG. 7 is a diagram showing the transportation of the molding materials and molded optical elements between the respective units and the timings for the conveyance thereof.

Here, in order to simplify the description, the operating time required for aforesaid transportation and conveyance is ignored. Also, the operating time required for carrying the molding material into the exchanging chamber 4 and collecting the molded optical element from the exchanging chamber is ignored.

Further, the minimum time required for the heating process at the heating station is assumed to be six minutes, and the minimum time required for the pressing process at the pressing station is assumed to be fifteen minutes. (Aforesaid process include the cooling of the molding members to a temperature enabling the molded optical element to be collected as described above.) In the present embodiments, therefore, it is established that the value (3) arrived at by dividing the time required for the heating process at the heating station (six minutes) by the number of the heating stations (2) and the value (3) arrived at by dividing the time required for the pressing process at the pressing station (fifteen minutes) by the number of the pressing stations (5) are equal.

In FIG. 7, the arrows in the vertical direction between the exchanging chamber 4 and the relaying station 12 indicate aforesaid transporting operations, and the arrows in the vertical direction between the relaying station 12, heating stations 14 and 16, and pressing stations 18, 20, 22, 24, and 26 indicate aforesaid conveying operations. The arrows in the horizontal direction in the heating stations 14 and 16, and pressing stations 18, 20, 22, 24, and 26 respectively indicate aforesaid heating processes and aforesaid pressing processes.

At first, the molding material (1) is transported from the exchanging chamber 4 to the relaying station 12 and is further conveyed to the heating station 14 where the heating process is performed for six minutes. Subsequently, the heated material is conveyed to the pressing station 18 for the pressing process of fifteen minutes. Then, the optical element thus obtained is conveyed to the relaying station 12 and is further transported to the exchanging chamber 4.

During this period, the molding materials (2), (3), (4), and (5) are sequentially conveyed to each of the empty stations for the respective processes in the same fashion.

Then, the molding materials (I), (II), (III), (IV), and (V) are processed likewise. These processes can be performed partially in parallel with the processes of the molding materials (1) through (5). Accordingly, the processes are continuously performed in the same way, and it is possible to carry out each of the heating processes at the respective heating stations and each of the pressing processes at the respective pressing stations sufficiently effectively.

As set forth above, according to the formation method of the present invention, the relaying station, and a plurality of pressing stations are disposed on a circle with its center in the vertical direction, and a conveying means is arranged at the position in the center in the vertical direction. Then, the molding material in the relaying station is conveyed to an empty heating station, the molding material in the heating station is conveyed to an empty pressing station, and the molded optical element in the pressing station is conveyed to the relaying station which is currently in an empty state by the conveying means. Hence, it becomes possible to miniaturize the apparatus and simplify its structure and perform a high-speed pressing formation with a high-efficiency because the molding material and molded optical element are conveyed in accordance with the time required for each of the processes at the respective stations to obtain an optimum efficiency.

Figure 8:
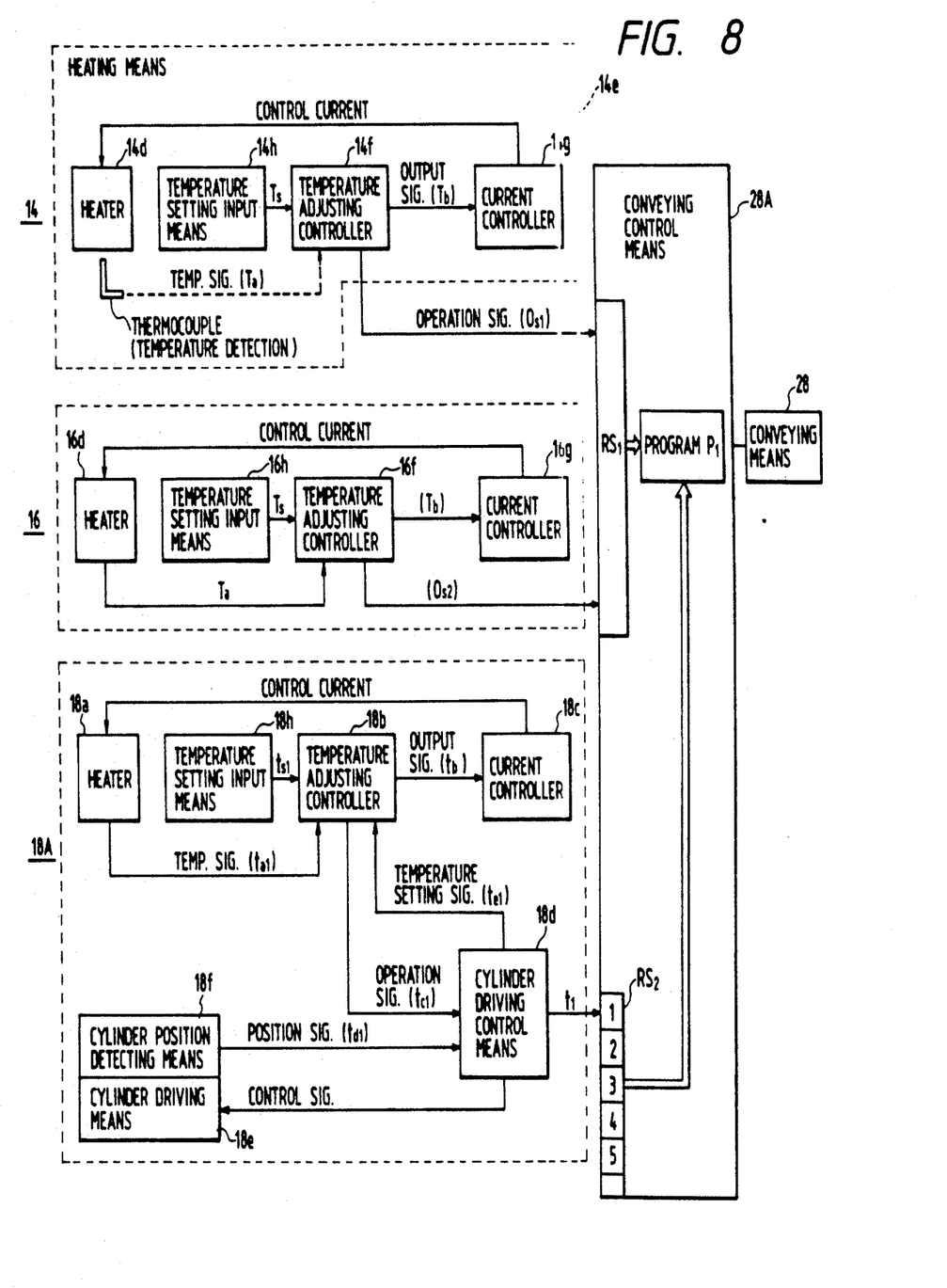
FIG. 8 is a block diagram showing means for controlling the embodiment represented in FIG. 1 through FIG. 7.

FIG. 8 is a block diagram showing control means for controlling the operation of aforesaid apparatus according to the embodiment shown in FIG. 1 through FIG. 7.

The heating station 14 (16) is provided with the heater 14d in the heating cylinder 14c, and the temperature detection is performed by a thermocouple incorporated in the heating station 14 (16) to detect the heater temperature, and the temperature signal Ta is output. A temperature adjusting controller 14f (16f) compares a signal corresponding to the setting temperature Ts of a setting temperature input means 14h (16h) and the temperature signal Ta of the thermocouple to output a control signal Tb for a current controller 14g (16g) to adjust the temperature of the heater 14d (16d) to match the setting temperature. The current controller 14g (16g) controls the current flowing to the heater 14d (16d) in accordance with the control signal Tb to raise or lower the heater temperature.

The operating signals $O_{s1}$ and $O_{s2}$ are the signals output from the temperature adjusting controller 14f (16f) when the signals Ts and Ta from the temperature adjusting controller 14f (16f) are matched or the difference of the signals Ts-Ta, reaches a value within the range of the predetermined threshold values, and by the presence of the signals $O_{s1}$ and $O_{s2}$, the operating condition of each of the heating stations 14 and 16 is detected The operating condition detecting signals $Os_1$ and $Os_2$ are inputted into the recording memory of a first register means RS in the control means 28a for controlling the conveying means 28, and the control means 28a records the heating station currently in operation.

The block 18A in FIG. 8 indicates the block diagram of the control means for the pressing station 18, and the control means for the other pressing stations 20, 22, 24, and 26 is also of the same structure. Therefore, the representation and description thereof will be omitted.

In the pressing station 18, the heater 18a is embedded to maintain the glass material heated in the heating stations 14 and 16 at the required molding temperature. The temperature of the heater 18a is detected by a thermocouple (not shown) to output a temperature signal $t_{a1}$. The signal $t_{a1}$ is inputted into the temperature adjusting controller 18b. The temperature adjusting controller 18b receives the input signal $t_{s1}$ of the setting temperature from the setting temperature input means 18h, and compares the aforesaid input signal $t_{s1}$ and the temperature signal $t_{a1}$.

The temperature adjusting controller 18b outputs a current control signal $t_b$ for the current controller 18c based on the comparison operation to allow the current controller to control the heater temperature. By the comparison operation by the temperature adjusting controller 18b, an operating signal $t_{c1}$ is output if the signal $t_1$ of the thermocouple matches the setting input signal $t_{s1}$ or the difference between those signals is within the predetermined values. The operating signal $t_{c1}$ is inputted into a cylinder control means 18d of the cylinder for driving the molding member in the pressing station, and the cylinder is driven by a cylinder driving means 18e.

By the movement of the upper shaft following the cylinder operation (refer to FIG. 2), the cylinder is suspended through the control means 18d by the detecting signal $t_{d1}$ from a position detecting means 18f (not shown in FIG. 2) to indicate the upper shaft suspension position.

The cylinder driving control means 18d inputs a signal $t_1$ indicating that the pressing station is in operation into a register $RS_2$ in the conveying control means 28A.

To the register $RS_2$ of the conveying control means 28A, the actuation signals $t_1 (t_2, \ldots)$ from each of the pressing stations 18, 20, 22, 24, and 26 are inputted, so that the operating condition of each of the pressing stations is registered for controlling.

In the registers $RS_1$ and $RS_2$ of the conveying control means 28A, a program control unit $P_1$ is incorporated to control the driving of the conveying means 28, and control the operating sequence of the conveying means 28 in accordance with the operating signals $Os_1$ and $Os_2$ and actuation signals $t_1, \ldots, t_5$.

The signal $t_{e1}$ is a signal output from the cylinder driving control means 18d to switch the temperatures of the molding members for the next glass material to proceed to its pressing cycle subsequent to the completion of the one cycle of the upper shaft to descend and ascend.

As the above describes, according to the block diagram shown in FIG. 8 for controlling the apparatus embodying the present invention, the signals to indicate the operating conditions of each of the heating stations 14 and 16 and each of the pressing stations 18, 20, 22, 24, and 26 are output, and based on these signals, it is possible to detect the current situation of each of the stations and to determine the station to which the conveying means should be transported for the required operation. Thus the formation operation can be performed smoothly.

What is claimed is:

1. A method for forming a glass preform into an optical element utilizing a formation chamber having a central axis and including a plurality of glass preform heaters, a plurality of glass preform pressing molds, and a conveyor, an exchanging chamber and a controller, said method comprising the steps of:
   providing the heaters and the pressing molds along a circular path substantially concentric with the formation chamber;
   providing the conveyor which rotates coaxially with the central axis of the formation chamber;
   detecting a first signal indicating an operation condition of each heater to determine which heaters are currently heating a glass preform and inputting the signal to the controller;
   conveying a glass preform from the exchanging chamber to a selected one of the heaters based on the detected conditions of the heaters;
   heating the glass preform;
   detecting a second signal indicating the operating condition of each pressing mold to determine which pressing molds are currently pressing a glass preform and inputting the signal to the controller;
   conveying the heater glass preform from the selected heater to a selected on of the pressing molds after confirming the operating conditions of each heater and each pressing mold;
   pressing the glass preform in the selected pressing mold to form an optical element; and
   removing the optical element from the pressing mold after a predetermined time.

2. A method for forming a glass preform into an optical element utilizing a formation chamber having a central axis and including a plurality of glass preform heaters, a plurality of glass preform pressing molds, a conveyor with a radially extendable arm, and a relay mechanism, an exchanging chamber and a controller, said method comprising the steps of:
   providing the heaters, the relay mechanism and the pressing molds along a circular path substantially concentric with the formation chamber;
   providing the conveyor which rotates coaxially with the central axis of the formation chamber;
   detecting the operating conditions of the heaters to determine which heaters are currently heating a glass preform;
   relaying the glass preform from the exchanging chamber to the formation chamber;
   conveying the glass preform from a relay station to a selected one of the heaters after confirming the operating condition of each heater;
   heating a glass preform;
   detecting the operating conditions of the pressing molds to determine which pressing molds are currently pressing a glass preform;
   conveying the heated glass reform to a selected one of the pressing molds after detecting the heating condition of the glass preform in each heater;
   pressing the glass preform in the selected pressing mold to form an optical element; and
   removing the optical element from the pressing mold after a predetermined time.

* * * * *

UNITED STATES PATENT AND TRADEMARK OFFICE
CERTIFICATE OF CORRECTION

PATENT NO. : 5,246,476
DATED : September 21, 1993
INVENTOR(S) : Yoshimura, et al.

It is certified that error appears in the above-indentified patent and that said Letters Patent is hereby corrected as shown below:

COLUMN 4:

Line 33, "the" (second occurrence) should read --the aforesaid fixed cylinder 20a.--.

COLUMN 9:

Line 21, "signal $t_1$" should read --signal $t_{a1}$--.

COLUMN 10:

Line 13, "operation" should read --operating--.
　Line 26, "on" should read --one--.

Signed and Sealed this

Twelfth Day of July, 1994

Attest:

BRUCE LEHMAN

Attesting Officer　　　　Commissioner of Patents and Trademarks